United States Patent
Baillon et al.

(10) Patent No.: US 9,251,711 B2
(45) Date of Patent: Feb. 2, 2016

(54) METHOD AND DEVICE FOR THE FILTERING OF ALERTS ORIGINATING FROM A COLLISION DETECTION SYSTEM OF AN AIRCRAFT

(75) Inventors: Bertrand Baillon, Saubens (FR); Stéphane Fleury, Colomiers (FR); Fabien Vittoz, Toulouse (FR)

(73) Assignee: Thales, Courbevoie (FR)

( * ) Notice: Subject to any disclaimer, the term of this patent is extended or adjusted under 35 U.S.C. 154(b) by 404 days.

(21) Appl. No.: 13/554,359

(22) Filed: Jul. 20, 2012

(65) Prior Publication Data
US 2013/0191016 A1 Jul. 25, 2013

(30) Foreign Application Priority Data

Jul. 22, 2011 (FR) .................................... 11 02293

(51) Int. Cl.
| | |
|---|---|
| *G08G 5/04* | (2006.01) |
| *G05D 1/06* | (2006.01) |
| *G08G 5/02* | (2006.01) |
| *B64D 45/04* | (2006.01) |

(52) U.S. Cl.
CPC ........ *G08G 5/04* (2013.01); *B64D 45/04* (2013.01); *G05D 1/0653* (2013.01); *G05D 1/0676* (2013.01); *G08G 5/02* (2013.01); *G08G 5/025* (2013.01)

(58) Field of Classification Search
CPC ............ G08G 5/00; G08G 5/04; G08G 5/02; G05D 1/00; G05D 1/06; G05D 1/0676; G05D 1/0653; B64D 45/00
USPC ................... 701/301; 340/970, 951
See application file for complete search history.

(56) References Cited

U.S. PATENT DOCUMENTS

| | | | | |
|---|---|---|---|---|
| 4,368,517 A * | 1/1983 | Lovering | ............ | G01C 23/005 340/972 |
| 5,166,682 A | 11/1992 | Bateman | | |
| 5,608,392 A | 3/1997 | Faivre et al. | | |
| 5,968,106 A * | 10/1999 | DeVlieg et al. | ........... | B60T 7/22 244/183 |
| 6,317,663 B1 * | 11/2001 | Meunier et al. | ................. | 701/16 |
| 6,405,107 B1 * | 6/2002 | Derman | ............... | G01C 23/005 340/3.5 |
| 7,085,630 B2 * | 8/2006 | Ryan et al. | ............ | B64C 25/426 701/16 |
| 8,264,377 B2 * | 9/2012 | Griffith | ................. | G01S 13/931 340/961 |
| 8,380,367 B2 * | 2/2013 | Schultz et al. | .................... | 701/3 |
| 8,515,600 B1 * | 8/2013 | McCusker | ........................ | 701/9 |
| 8,543,265 B2 * | 9/2013 | Ekhaguere et al. | ............. | 701/11 |
| 8,599,045 B2 * | 12/2013 | Khatwa et al. | ................. | 340/947 |

(Continued)

FOREIGN PATENT DOCUMENTS

| | | | |
|---|---|---|---|
| EP | 0674300 A1 | 9/1995 | |
| EP | 0989386 A1 | 3/2000 | |

(Continued)

*Primary Examiner* — Tuan C. To
(74) *Attorney, Agent, or Firm* — Baker & Hostetler LLP

(57) ABSTRACT

A method and a device for the filtering of alerts originating from a collision detection system of an aircraft makes it possible, by proposing a novel condition for alert disabling, to avoid an abnormal drop of an aircraft in the case of a CFIT (controlled flight into terrain) by authorizing the output of the alert when this novel condition is not complied with. This novel condition relies on a method for thresholding the angle of approach of the aircraft (FPA for flight path angle) as a function of the altitude of the aircraft with respect to the runway and of the angle of approach specified for each runway and which is recovered via the terrain database.

15 Claims, 4 Drawing Sheets

(56) References Cited

U.S. PATENT DOCUMENTS

| | | | |
|---|---|---|---|
| 2008/0262665 A1* | 10/2008 | Coulmeau et al. | G08G 5/0039 701/16 |
| 2009/0105890 A1* | 4/2009 | Jones et al. | 701/1 |
| 2009/0195413 A1* | 8/2009 | Constans | 340/971 |
| 2009/0204277 A1* | 8/2009 | Coulmeau et al. | 701/3 |
| 2010/0079308 A1* | 4/2010 | Fabre et al. | 340/951 |
| 2010/0125381 A1* | 5/2010 | Botargues et al. | 701/9 |
| 2010/0262358 A1* | 10/2010 | Boorman et al. | 701/120 |
| 2011/0022251 A1* | 1/2011 | Puig et al. | 701/16 |
| 2011/0163908 A1* | 7/2011 | Andersson et al. | G01S 5/0072 342/36 |
| 2011/0184590 A1* | 7/2011 | Duggan et al. | G05D 1/0061 701/2 |
| 2011/0184595 A1* | 7/2011 | Albert et al. | 701/16 |
| 2011/0309143 A1* | 12/2011 | Wood et al. | 235/400 |
| 2012/0075461 A1* | 3/2012 | Yu et al. | 348/117 |
| 2012/0078495 A1* | 3/2012 | Hamblin et al. | 701/120 |
| 2012/0265376 A1* | 10/2012 | Fleiger-Holmes et al. | 701/16 |
| 2013/0261949 A1* | 10/2013 | Eriksson | G05D 1/104 701/300 |
| 2014/0336848 A1* | 11/2014 | Saund et al. | 701/3 |

FOREIGN PATENT DOCUMENTS

| | | |
|---|---|---|
| EP | 1461792 A1 | 9/2004 |
| EP | 2328053 A1 | 6/2011 |
| WO | 03/077224 A1 | 9/2003 |

* cited by examiner

METHOD AND DEVICE FOR THE FILTERING OF ALERTS ORIGINATING FROM A COLLISION DETECTION SYSTEM OF AN AIRCRAFT

CROSS-REFERENCE TO RELATED APPLICATION

This application claims priority to foreign French patent application No. FR 1102293, filed on Jul. 22, 2011, the disclosure of which is incorporated by reference in its entirety.

FIELD OF THE INVENTION

The invention relates to the prevention of abnormal changes of altitude of an aircraft during low-speed flight phases.

BACKGROUND

Low-speed flight phases are dangerous for aircraft, in particular during landing phases where the margin for manoeuvre in relation to the terrain is all the more critical the lower the visibility and the altitude. To prevent abnormal changes of altitude and of attitude of the aeroplane, detection systems with terrain databases exist. But coupled with a disabling system and in the environs of an airport, they turn out to be inoperative. They then no longer offer the pilot the possibility of rescuing the aeroplane early enough before a collision with the ground in the case of an abnormal drop.

According to the known prior art, onboard terrain monitoring systems are based on simulated probers projected in front of the aircraft and derived from the speed of the aircraft with respect to the ground and the reaction time of the pilot. Whatever the altitude of the aircraft, a computer continuously verifies the rate of penetration of this prober with a terrain database, itself onboard. As soon as a nonzero penetration rate is detected and confirmed, the computer dispatches an alert to the pilot warning him of the proximity of the terrain.

A problem arises with such terrain detection systems at the moment of the approach of an airport where the aircraft is projected to land. Indeed, the altitude decreasing, the simulated probers intercept the terrain in the environs of the runway. It therefore becomes necessary to disable these alerts so as not to disturb the pilots in the course of this critical phase.

Recourse is then had to three complementary disabling methods:

The first method relies on the definition of a spatial envelope which extends in the three dimensions. This envelope is related to the runway threshold, to the precision of navigation of the aircraft, and to the geometric characteristics of the runway considered. As long as the aircraft is situated outside this envelope, the computer is authorized to output all the specified terrain alerts. The alerts are disabled when the aircraft is situated in the envelope.

The second method is related to the consistency of heading between the aircraft and the runway considered. One then speaks of convergence towards the runway in the horizontal plane. If the heading of the aeroplane does not converge quickly enough towards the axis of the runway, the computer remains potentially alerting.

Finally, the third method is based on the consistency of the vertical speed of the aircraft with respect to its altitude (with respect to the low limit of the spatial envelope). One then speaks of convergence of the vertical speed of the aircraft with respect to the ideal vertical speed at a given altitude (with respect to the low limit of the spatial envelope). At a given altitude, an aircraft whose vertical speed was outside of the theoretical envelope would see the terrain alerts appear in the case of collision of the probers with the terrain cells of the database. In this third method, disabling is authorized for downward vertical speeds even on the low limit of the spatial envelope.

Because of the uncertainties of positioning of the aircraft and runway thresholds, current onboard terrain detection systems do not make it possible to warn the pilot of the imminence of an impact as soon as the aircraft is situated in the environs of an airport or of a runway covered by this alerts disabling system.

Indeed, the vertical part of a landing runway spatial disabling envelope covers a ground area which amply exceeds that of the runway. FIG. 1 represents a landing runway 201 and a spatial disabling envelope projected onto the ground. The runway comprises a runway threshold G. The disabling zone projected onto the ground is defined on the basis:

of a first point S, situated at a distance Δ from the runway threshold G and placed so that the segment GS is situated in the longitudinal axis of the runway, of a second point O and of a third point E, which are situated at a distance Δ from the runway threshold G and placed on a straight line perpendicular to the longitudinal axis of the runway, of a fourth point N placed so that the segment GN follows the longitudinal axis of the runway.

The parameter Δ is related to the precision of navigation of the aircraft. The risk of CFIT is therefore all the larger the more significant the parameter Δ (low precision).

In practice, an aircraft may find itself in an abnormal drop situation even though it satisfies all the conditions (horizontal and vertical) of convergence and therefore of disabling of the terrain proximity alerting system. Therefore in this case the aircraft is at risk of hitting the ground before the runway threshold.

SUMMARY OF THE INVENTION

The invention is aimed at alleviating the problems cited previously by proposing an improved method and device for the filtering of alerts originating from a terrain collision detection system embedded aboard an aircraft.

For this purpose, the subject of the invention is a method for the filtering of alerts originating from a terrain collision detection system embedded aboard an aircraft in a landing runway approach phase, the said aircraft flying according to a speed vector (V), the said landing runway comprising a runway threshold (G), characterized in that it comprises the following steps:

the determination of an angle of descent α defined on the basis of approach procedures predefined for the said landing runway, the determination of a factor k defined on the basis of the angle of descent α, of the altitude H of the aircraft with respect to the landing runway and of the distance x on the ground between the aircraft and the runway threshold (G), the determination of a first threshold ($S_1$) on the basis of an angle of approach (FPA) of the aircraft, the angle of approach (FPA) of the aircraft being the angle between the speed vector (V) of the aircraft and a horizontal line, the disabling of the terrain alert, if the factor k is positive and is less than the first determined threshold (S1) and if the angle of approach (FPA) of the aircraft is less than a predetermined second threshold ($FPA_{max}$).

The invention has the advantage of being parametrizable. Indeed, through the second threshold $FPA_{Max}$, it is possible to adjust the disabling condition as a function of the type of runway used.

The invention has the advantage of adapting exactly to the approach data defined in the predefined procedures associated with the runway (charts). Indeed, the angle of approach FPA of the aircraft is compared with a limit angle of approach α dependent on the configuration of the terrain all around the runway.

The invention also has the advantage of being complementary to the existing disabling systems.

The invention makes it possible to authorize the output of a terrain alert even though all the disabling conditions of the prior art are satisfied. This makes it possible to forewarn the pilot of the aircraft of an abnormal behaviour of the aircraft and to avoid a collision with the terrain.

Advantageously, the angle of descent (α) is equal to the maximum of the angles of approach which are defined by approach procedures predefined for the landing runway.

Advantageously, the factor k is computed on the basis of the following relation:

$$k=(H-y)/y$$

where H is the difference in altitude between the aircraft and the threshold of the runway G, and where y follows the following relation:

$$y=x.\tan(\alpha),$$

with α the angle of descent defined on the basis of the approach procedures predefined for the runway and x the distance on the ground between the aircraft and the runway threshold G.

Advantageously, the first threshold ($S_1$) is computed on the basis of the following relation:

$$S1=(FPA-\alpha)/(FPA_{Max}-\alpha)$$

where FPA is the angle of approach of the aircraft, α the angle of descent defined on the basis of the predefined approach procedures and $FPA_{Max}$ the second threshold.

Advantageously, the first threshold ($S_1$) is computed as a function of the angle of approach of the aircraft FPA and according to a piecewise linear function.

Advantageously, the said method is activated when the aircraft is situated between a first point and the runway threshold, the first point being situated at a distance upstream of the runway threshold and placed so that the segment formed by the said runway threshold and the said first point is situated in the longitudinal axis of the runway, the distance being related to the precision of navigation of the aircraft.

The invention also relates to a device for the filtering of alerts originating from a terrain collision detection system embedded aboard an aircraft in a landing runway approach phase, the said aircraft flying according to a speed vector (V), the said landing runway comprising a runway threshold (G), characterized in that it comprises:

means for determining an angle α defined on the basis of approach procedures predefined for the said landing runway, means for determining a factor k defined on the basis of the angle of descent (α), of the altitude (H) of the aircraft with respect to the landing runway and of the distance (x) on the ground between the aircraft and the runway threshold (G)

means for determining a first threshold ($S_1$) on the basis of the angle of approach (FPA) of the aircraft, the angle of approach (FPA) of the aircraft being the angle between the speed vector (V) of the aircraft and a horizontal line, means for disabling the terrain alert, if the factor k is positive and is less than the first determined threshold ($S_1$) and if the angle of approach (FPA) of the aircraft is less than a predetermined second threshold ($FPA_{max}$).

Advantageously, the device for the filtering of alerts comprises, furthermore, a temporal confirmer linked to the disabling means, the said disabling means being able to emit a disabling signal, the confirmer transmitting the disabling signal so as to disable the terrain alert only if the disabling signal is maintained for at least a predetermined duration.

Advantageously, the said terrain alert disabling means are activated when the aircraft is situated between a first point and the runway threshold, the first point being situated at a distance upstream of the runway threshold and placed so that the segment formed by the said runway threshold and the said first point is situated in the longitudinal axis of the runway, the distance being related to the precision of navigation of the aircraft.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION

The method according to the invention allows the filtering of alerts originating from a terrain collision detection system embedded aboard an aircraft in a landing runway approach phase. The aircraft flies according to a speed vector V. The landing runway comprises a runway threshold G.

The invention makes it possible, by proposing a novel condition for alert disabling, to avoid an abnormal drop of an aircraft in the case of a CFIT (controlled flight into terrain) by authorizing the output of the alert when this novel condition is not complied with. This novel condition relies on a method for thresholding the angle of approach of the aircraft (FPA for flight path angle) as a function of the altitude of the aircraft with respect to the runway and of the angle of approach specified for each runway and which is recovered via the terrain database.

Figure 1:
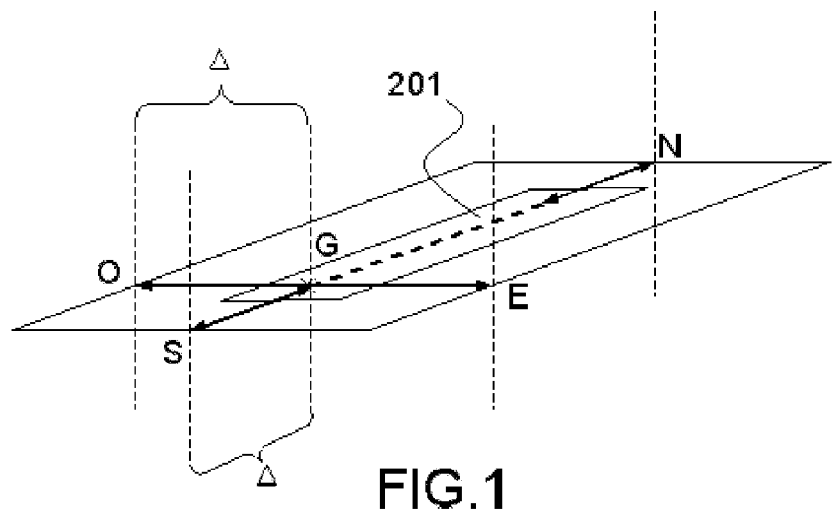
FIG. 1, already presented, represents a landing runway and a disabling zone.
Figure 2:
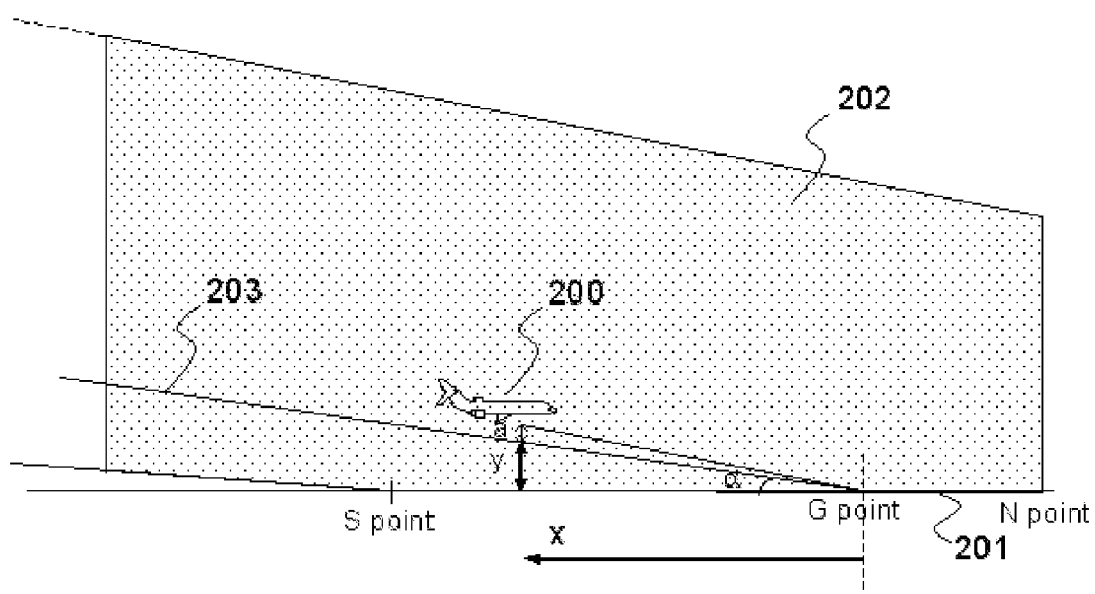
FIG. 2 represents an aircraft in a landing runway approach phase.

FIG. 2 represents an aircraft 200 in a landing runway 201 approach phase. The figure shows the runway threshold G, the first point S and the fourth point G mentioned previously.

The hatched area 202 represents the sectional cut through the vertical plane parallel to the axis of the runway of the disabling volume. The zone of greatest danger is situated between the points S and G since the alerts remain disabled until the ground well before the start of the runway.

The angle of approach (FPA for Flight Path Angle) is the angle of slope of the speed vector of the aircraft with respect to the horizontal.

As the aircraft approaches the runway, its angle of slope must allow the aircraft to converge towards the point G so that the landing gear does not touch the zone situated before this point.

The figure also illustrates a convergence line 203 passing through the runway threshold G and forming an angle $\alpha$ defined on the basis of approach procedures predefined for this runway.

According to a characteristic of the invention, the angle of descent $\alpha$ of the convergence line is equal to the maximum of the angles of approach that are defined by the approach procedures for this runway.

This convergence line 203 is used to verify the vertical convergence of the aircraft in the approach phase.

The following values are defined:
- X, the distance on the ground between the aircraft and the runway threshold G,
- H, the difference in altitude between the aircraft and the threshold of the runway G
- $y = x \cdot \tan(\alpha)$, the value y represents the height of the convergence line plumb with the aircraft with respect to the altitude of the runway threshold
- a, the difference between H and y.

H is determined for example on the basis of a radioaltimeter 506 of the aircraft indicating the altitude of the aircraft and of the elevation of the runway threshold arising from a terrain database.

The application of the method according to the invention is particularly relevant when the aircraft is situated between the first point S and the runway threshold G.

Figure 3:
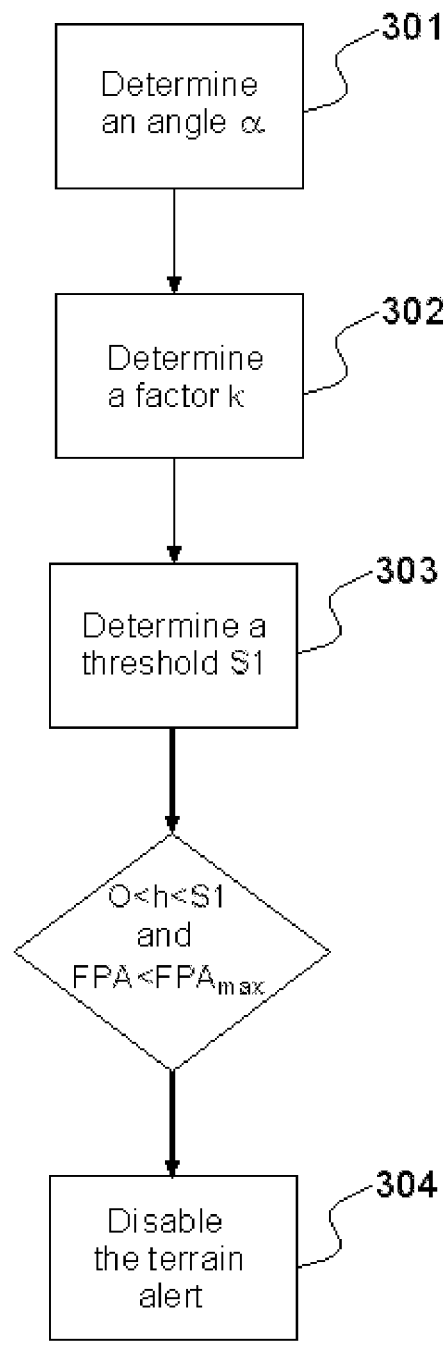
FIG. 3 represents a diagram of the method according to the invention.

FIG. 3 represents a diagram of the method according to the invention. The method according to the invention comprises the following steps:
- the determination 301 of an angle of descent $\alpha$ defined on the basis of approach procedures predefined for the said landing runway,
- the determination 302 of a factor k defined on the basis of the angle of descent $\alpha$, of the altitude H of the aircraft with respect to the landing runway and of the distance x on the ground between the aircraft and the runway threshold G
- the determination 303 of a first threshold $S_1$ on the basis of the angle of approach FPA of the aircraft, the angle of approach FPA of the aircraft being the angle between the speed vector V of the aircraft and a horizontal line,
- the disabling 304 of the terrain alert, if the factor k is positive and is less than the first determined threshold S1 and if the angle of approach FPA of the aircraft is less than a predetermined second threshold $FPA_{max}$.

According to a characteristic of the invention, the angle of descent $\alpha$ is equal to the maximum of the angles of approach defined by approach procedures predefined for the landing runway (procedures also called charts in English).

According to another characteristic of the invention, the factor k is computed on the basis of the following relation:

$$k = (H-y)/y$$

where H is the difference in altitude between the aircraft and the threshold of the runway G, and where y follows the following relation:

$$y = x \cdot \tan(\alpha),$$

with $\alpha$ the angle of descent defined on the basis of the approach procedures predefined for the runway and x the distance on the ground between the aircraft and the runway threshold G.

According to one embodiment of the invention, the first threshold $S_1$ is computed on the basis of the following relation:

$$S1 = (FPA - \alpha)/(FPA_{Max} - \alpha)$$

In practice other linear or nonlinear arithmetical relations may be used to define the threshold as a function of the angle of approach FPA of the aircraft, of the angle of descent $\alpha$ defined on the basis of predefined approach procedures and of the predetermined second threshold $FPA_{max}$.

Figure 4:
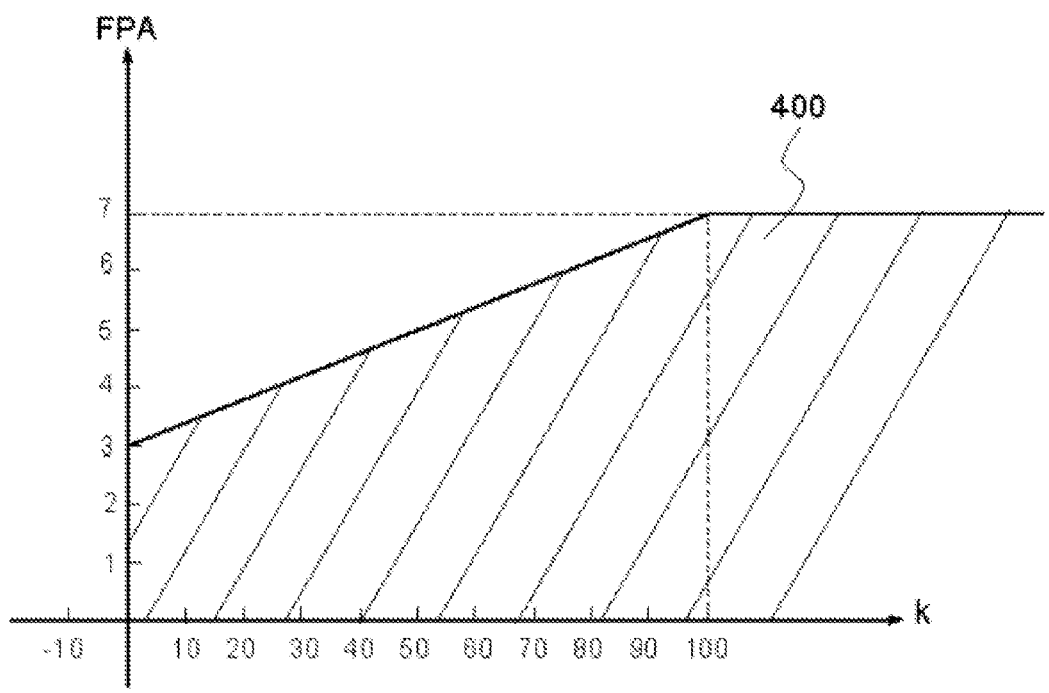
FIG. 4 represents an example of a disabling envelope defined with respect to the angle of descent of the aircraft and the factor k.

In practice in order for disabling to operate, the angle of approach FPA of the aircraft must be contained in an envelope dependent on the factor k. FIG. 4 represents a first example of a disabling envelope defined with respect to the angle of descent of the aircraft and the factor k.

The abscissa axis represents the factor k expressed as a percentage, the ordinate axis the angle of descent of the aircraft. The disabling envelope 400 is represented by the hatched part.

A point whose coordinates are formed by a pair consisting of angle of approach FPA and factor k (expressed as a percentage), situated in the envelope 400 corresponds to a situation where the alarm is disabled. Conversely, a point situated outside of this envelope corresponds to absence of disabling of the alarm.

It is assumed in the example that the angle $\alpha$ defined on the basis of predefined approach procedures is 3 degrees and that the second threshold $FPA_{Max}$ is 7 degrees.

The threshold S1 is defined according to the relation $(FPA - \alpha)/(FPA_{Max} - \alpha)$ i.e.

$$S1 = (FPA - 3)/(7 - 3) = (FPA - 3)/4$$

For example, if the aircraft is following an angle of approach FPA of 5 degrees then the threshold S1 equals 0.5 i.e. 50% if it is expressed as a percentage. If the factor k is greater than this value the alarm is disabled.

For example, if the aircraft is situated at a height H of 1000 feet and if the value y equals 750 feet the factor k then equals ⅓, it is less than the first S1 and the alarm is not disabled.

Figure 6:
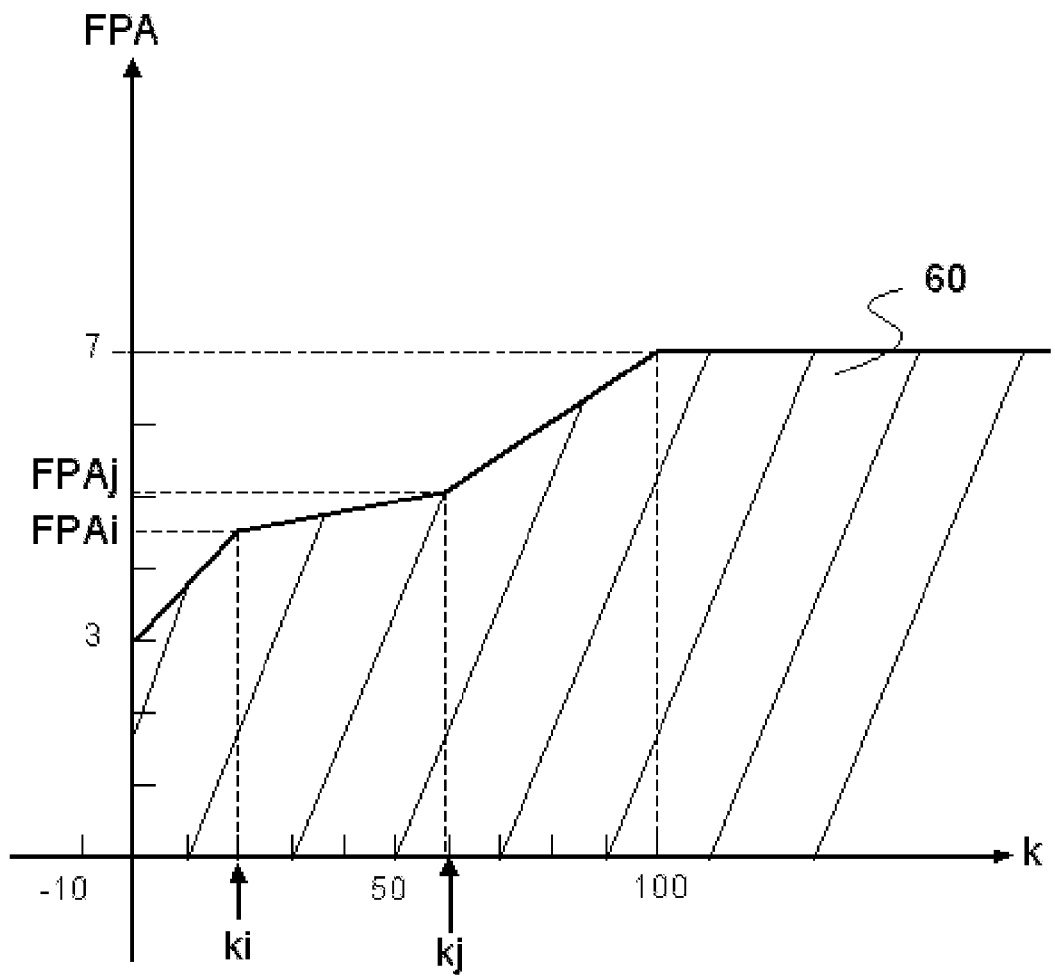
FIG. 6 presents a second example of a disabling envelope defined with respect to the angle of descent of the aircraft and the factor k.

FIG. 6 presents a second example of a disabling envelope defined with respect to the angle of descent of the aircraft and the factor k. The disabling envelope 600 is represented by the hatched part. Just as for the preceding example, the angle $\alpha$ defined on the basis of predefined approach procedures is 3 degrees and the second threshold $FPA_{Max}$ is 7 degrees.

But unlike in the preceding example, the threshold S1 is not defined according to a linear function of FPA but according to a piecewise linear function.

This function is defined notably by a first point with coordinates ki, FPAi and a second point with coordinates kj FPAj.

This characteristic makes it possible to have a parametrizable curve adaptable as a function of the aircraft. For example, small aircraft exhibit more significant margins for manoeuvre than wide-bodied craft.

Figure 5:
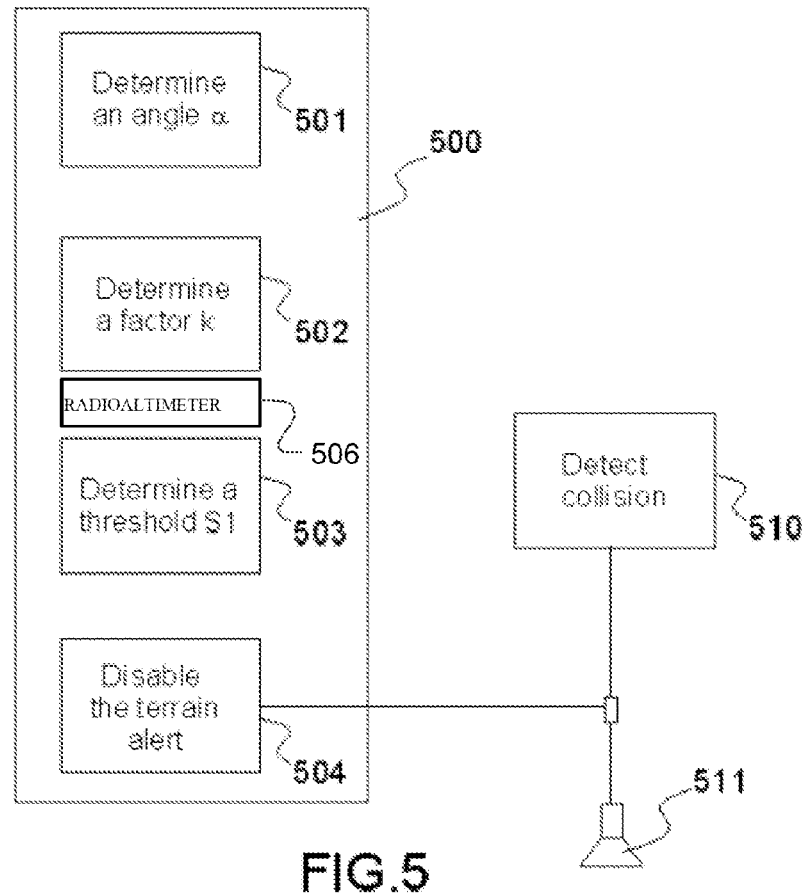
FIG. 5 represents an exemplary implementation of the device according to the invention.

FIG. 5 represents an exemplary implementation of the device according to the invention. The invention also relates to a device 500 for the filtering of alerts originating from a terrain collision detection system 510 embedded aboard an aircraft in a landing runway approach phase. The device comprises:
- means 501 for determining an angle of descent $\alpha$ defined on the basis of approach procedures predefined for the said landing runway, means 502 for determining a factor k defined on the basis of the angle of descent α, of the altitude H of the aircraft (that may be determined from the radioaltimeter 506) with respect to the landing runway and of the distance x on the ground between the aircraft and the runway threshold G means 503 for determining a first threshold $S_1$ on the basis of the angle of approach FPA of the aircraft, the angle of approach FPA of the aircraft being the angle between the speed vector of the aircraft and a horizontal line, means 504 for disabling the terrain alert, if the factor k is positive and is less than the first determined threshold S1 and if the angle of approach FPA of the aircraft is less than a predetermined second threshold $FPA_{max}$.

The collision detection system 510 comprises means 511 for emitting terrain alerts. The means 511 for emitting terrain alerts comprise for example a loudspeaker for emitting sound alerts or else a screen for emitting visual alerts. The disabling means 504 are linked to the collision detection system 510 so as to prevent the emissions of alerts, as appropriate.

According to one embodiment of the invention, the device for the filtering of alerts furthermore comprises a temporal confirmer 505 linked to the disabling means, the said disabling means 504 being able to emit a disabling signal, the confirmer transmitting the disabling signal so as to disable the terrain alert only if the disabling signal is maintained for at least a predetermined duration.

This characteristic makes it possible to avoid an absence of disabling of the terrain alert when the angle of approach FPA or the factor k exits the envelope for a short instant. The predetermined duration may be for example one or two seconds.

The device according to the invention can moreover be inserted into an existing disabling system, for example a system implementing the three known convergence conditions of the prior art.

In this case, a terrain alert will be disabled only if the existing system and the device according to the invention jointly authorize the disabling of the alert.

In the converse case, if at least one of the convergence conditions is not complied with or if the device according to the invention does not disable the alarm then this alarm will be emitted.

Advantageously, the terrain alert disabling means 504 are activated when the aircraft is situated between a first point S and the runway threshold G, the first point S being situated at a distance Δ upstream of the runway threshold G and placed so that the segment formed by the said runway threshold G and the said first point S is situated in the longitudinal axis of the runway, the distance Δ being related to the precision of navigation of the aircraft.

In practice, the more precise the navigation instruments (for example a GPS system, or an inertial platform) of the aircraft the shorter the distance Δ. Indeed, the higher the navigation precision, the less uncertainty there is about the positioning of the aircraft and the more the activation of the disabling means 504 may be delayed in the course of the descent.

The method and the device according to the invention may be implemented for example on a flight computer, embedded aboard the aircraft, comprising processors and storage memories. They may be realized in a software or hardware manner in the form of specialized electronic circuits.

The invention claimed is:

1. A method for filtering alerts originating from a ground collision detection system, embedded aboard an aircraft, during a landing runway approach phase, said aircraft flying according to a speed vector (V), said landing runway comprising a runway threshold (G), the method comprising the following steps:

determination of an angle of descent (α) defined on a basis of approach procedures predefined for said landing runway by a filtering device, measurement of an altitude (H) of the aircraft with respect to the landing runway using an altimeter, determination of a factor (k) defined on a basis of said angle of descent (α), of the measured altitude (H) of the aircraft with respect to the landing runway and of the distance x on the ground between the aircraft and the runway threshold (G) by the filtering device, determination of a first threshold ($S_1$) by the filtering device on a basis of an angle of approach (FPA) of the aircraft, the angle of approach (FPA) of the aircraft being the angle between the speed vector (V) of the aircraft and a horizontal line, and disabling of the ground alert of the ground collision detection system using the filtering device if the factor (k) is positive and is less than the first determined threshold (S1) and if the angle of approach (FPA) of the aircraft is less than a predetermined second threshold ($FPA_{max}$), whereby false alerts during a landing runway approach phase are avoided.

2. The method for filtering alerts according to claim 1, wherein said angle of descent (α) is equal to a maximum of the angles of approach which are defined by approach procedures predefined for the landing runway.

3. The method for filtering alerts according to claim 1, wherein the factor k is computed on a basis of the following relation:

$$k=(H-y)/y$$

where H is the measured altitude of the aircraft with respect to the threshold of the runway G, and where y follows the following relation:

$$y=x.tang(\alpha),$$

with α the angle of descent defined on a basis of the approach procedures predefined for the runway and x the distance on the ground between the aircraft and the runway threshold G.

4. The method for filtering alerts according to claim 1, wherein the first threshold ($S_1$) is computed on the basis of the following relation:

$$S1=(FPA-\alpha)/(FPA_{Max}-\alpha)$$

where FPA is the angle of approach of the aircraft, α the angle of descent defined on the basis of the predefined approach procedures and $FPA_{Max}$ the second threshold.

5. The method for filtering alerts according to claim 1, wherein the first threshold ($S_1$) is computed as a function of the angle of approach of the aircraft FPA and according to a piecewise linear function.

6. The method for filtering alerts according to claim 1, said method being activated when the aircraft is situated between a first point (S) and the runway threshold (G), the first point (S) being situated at a distance (Δ) upstream of the runway threshold (G) and placed so that the segment formed by said runway threshold (G) and said first point (S) is situated in the longitudinal axis of the runway, the distance (Δ) being related to the precision of navigation of the aircraft.

7. A device for filtering alerts originating from a ground collision detection system, embedded aboard an aircraft, during a landing runway approach phase, said aircraft flying according to a speed vector (V), said landing runway comprising a runway threshold (G), the device comprising:

an altimeter for measuring an altitude (H) of the aircraft with respect to the landing runway, a computer configured to determine a factor k defined on a basis of said angle of descent (α), of the measured altitude (H) of the aircraft with respect to the landing runway and of a distance (x) on the ground between the aircraft and the runway threshold (G), the computer further configured to determine a first threshold ($S_1$) on a basis of an angle of approach (FPA) of the aircraft, the angle of approach (FPA) of the aircraft being the angle between the speed vector (V) of the aircraft and a horizontal line, and the computer further configured to disable the ground alert of the ground collision detection system if the factor k is positive and is less than the first determined threshold (S1) and if said angle of approach (FPA) of the aircraft is less than a predetermined second threshold ($FPA_{max}$).

8. The device for filtering alerts according to claim 7, wherein said computer is further configured to emit a disabling signal, the ground alert being disabled only if the disabling signal is maintained for at least a predetermined duration.

9. The device for filtering alerts according to claim 7, wherein the computer is further configured to disable the ground alert of the ground collision detection system when the aircraft is situated between a first point (S) and the runway threshold (G), the first point (S) being situated at a distance (Δ) upstream of the runway threshold (G) and placed so that the segment formed by the said runway threshold (G) and said first point (S) is situated in the longitudinal axis of the runway, the distance (Δ) being related to the precision of navigation of the aircraft.

10. A method of flying an aircraft during a landing runway approach phase, said landing runway comprising a runway threshold (G), the method comprising the following steps:

flying said aircraft at a speed vector (V);

using a filtering device for determining an angle of descent (α) defined on a basis of approach procedures predefined for said landing runway;

using an altimeter for measuring an altitude (H) of the aircraft with respect to the landing runway;

using said filtering device for determining a factor (k) defined on a basis of said angle of descent (α), of the measured altitude (H) of the aircraft with respect to the landing runway and of the distance x on the ground between the aircraft and the runway threshold (G);

using said filtering device for determining a first threshold ($S_1$) on a basis of an angle of approach (FPA) of the aircraft, the angle of approach (FPA) of the aircraft being the angle between the speed vector (V) of the aircraft and a horizontal line; and disabling a ground alert of a ground collision detection system embedded aboard an aircraft using the filtering device if the factor (k) is positive and is less than the first determined threshold (S1) and if the angle of approach (FPA) of the aircraft is less than a predetermined second threshold ($FPA_{max}$).

11. The method of flying an aircraft according to claim 10, wherein said angle of descent (α) is equal to a maximum of the angles of approach which are defined by approach procedures predefined for the landing runway.

12. The method of flying an aircraft according to claim 10, wherein the factor k is computed on a basis of the following relation:

$$k=(H-y)/y$$

where H is the measured altitude of the aircraft with respect to the threshold of the runway G, and where y follows the following relation:

$$y=x.\tan(\alpha),$$

with α the angle of descent defined on a basis of the approach procedures predefined for the runway and x the distance on the ground between the aircraft and the runway threshold G.

13. The method of flying an aircraft according to claim 10, wherein the first threshold ($S_1$) is computed on the basis of the following relation:

$$S1=(FPA-\alpha)/(FPA_{Max}-\alpha)$$

where FPA is the angle of approach of the aircraft, α the angle of descent defined on the basis of the predefined approach procedures and $FPA_{Max}$ the second threshold.

14. The method of flying an aircraft according to claim 10, wherein the first threshold ($S_1$) is computed as a function of the angle of approach of the aircraft FPA and according to a piecewise linear function.

15. The method of flying an aircraft according to claim 10, said method being carried out when the aircraft is situated between a first point (S) and the runway threshold (G), the first point (S) being situated at a distance (Δ) upstream of the runway threshold (G) and placed so that the segment formed by said runway threshold (G) and said first point (S) is situated in the longitudinal axis of the runway, the distance (Δ) being related to the precision of navigation of the aircraft.

* * * * *